(12) United States Patent
Verdier et al.

(10) Patent No.: US 9,518,512 B2
(45) Date of Patent: Dec. 13, 2016

(54) METHOD FOR STARTING A TURBOMACHINE

(75) Inventors: Hubert Pascal Verdier, Nay (FR); Philippe Etchepare, Pau (FR); Pierre Giralt, Pau (FR); Luc Reberga, Pau (FR)

(73) Assignee: TURBOMECA, Bordes (FR)

( * ) Notice: Subject to any disclaimer, the term of this patent is extended or adjusted under 35 U.S.C. 154(b) by 749 days.

(21) Appl. No.: 13/979,190

(22) PCT Filed: Jan. 3, 2012

(86) PCT No.: PCT/FR2012/050005
§ 371 (c)(1),
(2), (4) Date: Jul. 11, 2013

(87) PCT Pub. No.: WO2012/095590
PCT Pub. Date: Jul. 19, 2012

(65) Prior Publication Data
US 2013/0291551 A1 Nov. 7, 2013

(30) Foreign Application Priority Data

Jan. 11, 2011 (FR) ...................................... 11 50206

(51) Int. Cl.
*F02C 7/26* (2006.01)
*F02C 7/27* (2006.01)
*F02C 7/262* (2006.01)

(52) U.S. Cl.
CPC ................. *F02C 7/27* (2013.01); *F02C 7/262* (2013.01); *F05D 2220/329* (2013.01); *F05D 2260/85* (2013.01)

(58) Field of Classification Search
CPC .............. F02C 7/26; F02C 7/268; F02C 7/27; F02C 7/275; F02C 7/277; F02C 7/262
(Continued)

(56) References Cited

U.S. PATENT DOCUMENTS 5,844,383 A * 12/1998 Denaci ..................... F02C 7/264
123/179.3
5,907,949 A * 6/1999 Falke ........................ F02C 7/26
60/779

(Continued)

FOREIGN PATENT DOCUMENTS

EP 1 953 454 8/2008
EP 2 264 297 12/2010
(Continued)

OTHER PUBLICATIONS

International Search Report Issued Mar. 14, 2012 in PCT/FR12/050005 filed Jan. 3, 2012.

*Primary Examiner* — Steven Sutherland
(74) *Attorney, Agent, or Firm* — Oblon, McClelland, Maier & Neustadt, L.L.P.

(57) ABSTRACT

A method of starting a turbine engine, including a re-try performed if a main injector has not ignited when a shaft has reached a first predetermined speed value, the re-try including: a stopping during which a starter and the ignitor device are stopped; a second ignition during which fuel is injected into the combustion chamber, the ignitor device being actuated, the second ignition being performed when a speed of rotation of the shaft reaches a second predetermined speed value; and a second starting during which the starter is actuated once more to drive the shaft in rotation.

10 Claims, 3 Drawing Sheets

(58) Field of Classification Search
USPC .............................. 60/778, 39.13, 786, 788
See application file for complete search history.

(56) References Cited

U.S. PATENT DOCUMENTS

| | | | | |
|---|---|---|---|---|
| 6,810,677 | B2 * | 11/2004 | Dewis | F02C 7/26 |
| | | | | 60/778 |
| 7,509,812 | B2 * | 3/2009 | Mehrer | F02C 7/264 |
| | | | | 60/39.821 |
| 7,861,534 | B2 * | 1/2011 | Terlecki | F01D 19/00 |
| | | | | 60/39.281 |
| 8,925,328 | B2 * | 1/2015 | Rodd | F01D 19/00 |
| | | | | 60/39.13 |
| 2003/0110777 | A1 * | 6/2003 | O'Connor | F02C 7/26 |
| | | | | 60/778 |
| 2010/0024431 | A1 | 2/2010 | Panov | |
| 2010/0126179 | A1 * | 5/2010 | Botarelli | F01D 19/00 |
| | | | | 60/778 |
| 2010/0319357 | A1 | 12/2010 | Gazzino et al. | |

FOREIGN PATENT DOCUMENTS

| | | |
|---|---|---|
| JP | 2002 357128 | 12/2002 |
| JP | 2003 328777 | 11/2003 |

\* cited by examiner

METHOD FOR STARTING A TURBOMACHINE

BACKGROUND OF THE INVENTION

1. Field of the Invention

The present invention relates to the field of turbine engines, and in particular to the field of turboshaft engines for aircraft.

More precisely, the present invention relates to a method of starting a turbine engine, said turbine engine comprising:
- a combustion chamber having an ignitor device and at least one main injector, said chamber presenting an outlet;
- a shaft connected to a compressor wheel arranged upstream from the combustion chamber in order to feed it with compressed air;
- a starter connected to said shaft;

said method comprising:
- a first starting step during which the starter is actuated in order to drive the shaft in rotation; and
- a first ignition step during which fuel is injected into the combustion chamber the ignitor device being actuated. During this step, the main injectors are preferably fed with fuel.

2. Description of the Related Art

Normally, at the end of the first starting step, stable combustion is established in the combustion chamber after being initiated by the ignitor device, which is usually a spark plug, thereby leading to the turbine engine starting.

Once a turbine engine has started, i.e. once the high-pressure turbine is under rotary drive from the stream of burnt gas leaving the combustion chamber and enables the shaft to be driven in rotation in autonomous manner, the ignitor device and the starter are switched off.

Nevertheless, at attempt at starting the turbine engine may fail, e.g. if the torque from the starter is too high or indeed if the fuel injection pressure becomes established while also the shaft is already being driven by the starter at a speed of rotation that is too fast. This may happen, for example, as a result of air being present in the fuel feed circuit or indeed it may happen when the outside temperature is very low.

BRIEF SUMMARY OF THE INVENTION

An object of the present invention is to provide a method of starting a turbine engine that is more reliable, while also making it possible to extend the range over which starting can be performed to conditions that are difficult, such as for example starting at high altitude or at very low temperature.

The invention achieves this object by the fact that the method further includes a re-try step that is performed if combustion is not properly established when the shaft has reached a first predetermined speed value, said re-try step comprising:
- a stop step during which the starter and the ignitor device are stopped;
- a second ignition step during which fuel is injected into the combustion chamber, the ignitor device being actuated, said second ignition step being performed when the speed of rotation of the shaft reaches a second predetermined speed value; and
- a second starting step during which the starter is actuated once more in order to drive the shaft in rotation.

The re-try step is thus performed if ignition of the turbine engine has failed.

During the ignition and starting steps, fuel is injected via the main injector, or if one is present, via a starting injector as well as the main injector. The starting injector may be distinct from the main injector or it may be incorporated therein (a two-circuit main injector).

Failure of ignition of the turbine engine is defined herein as being the absence of combustion producing sufficient heat when the shaft has reached a first predetermined speed value. Under such circumstances, the speed of the shaft lies outside a speed window, known as the "starting" window, defined between a very low speed value and some other speed value lying between the first and second predetermined speed values.

Furthermore, the second ignition step and the second starting step are performed after the deceleration step.

It can thus be understood that when the first attempt at igniting the turbine engine has failed, the re-try step is a new attempt at starting the turbine engine. This step is advantageously performed when the speed of rotation of the shaft has decreased as a result of the starter being stopped, and has decreased sufficiently to lie once more in the ignition window.

Furthermore, by means of the invention, the speed of rotation of the shaft remains within the ignition window for longer, thereby maximizing the chances of starting.

In the invention, the speed of rotation of the shaft is thus brought back to the ignition window by stopping the starter before performing the second ignition step. In other words the shaft decelerates during the stop step.

Preferably but non-exclusively, the injection of fuel is stopped during the stop step.

In a variant, the second ignition step and the second starting step may be concomitant.

In preferred and non-exclusive manner, for a turboshaft engine for a helicopter type aircraft, the first predetermined speed value lies in the range 15% to 20% of the maximum engine speed, while the second predetermined speed value lies in the range 10% to 15% of the maximum engine speed.

Advantageously, the stop step is performed if the temperature at the outlet from the combustion chamber, as measured when the shaft has reached the first predetermined speed value, is lower than a first predetermined temperature value.

The temperature measured at the outlet from the combustion chamber is an indicator that is advantageous from the point of view of determining whether combustion is correctly installed (i.e. whether the main injector(s) is/are correctly ignited, or not, and/or whether the starting injector(s) is/are correctly ignited, or not).

The first predetermined temperature value is thus selected so that if a temperature is measured at the outlet from the combustion chamber that is greater than that, then the combustion chamber has very probably been ignited correctly.

Conversely, if a temperature is measured that is lower than the first predetermined temperature value, then it is very probable that the combustion chamber has not been ignited.

In preferred but non-exclusive manner, the first predetermined temperature values lies in the range 150° C. to 250° C.

In a variant, the first predetermined temperature value is determined from the temperature of the turbine engine at the beginning of the first ignition step. For example, the first predetermined temperature value may correspond to the temperature being about 100° C. higher than the temperature of the turbine engine at the beginning of the first attempt at starting.

Thus, if ignition of the chamber during the first ignition step has failed, this failure being detected by measuring a temperature at the outlet from the combustion chamber, the starter and the ignitor device are stopped until the speed of the shaft becomes less than the second predetermined speed value, after which the second ignition step is performed.

Advantageously, the second starting step is performed after a certain amount of time has elapsed since the second starting step.

An advantage is to ensure that the main injector (or the starting injector, if there is one) is correctly ignited before once more increasing the speed of rotation of the shaft, thereby limiting any risk of once more leaving the ignition window without the chamber being ignited.

Preferably, the second starting step is performed when the temperature at the outlet from the combustion chamber has reached a second predetermined temperature value.

This test makes it possible to ensure that the main injector and/or the starting injector have ignited correctly.

This second predetermined temperature value is lower than the first predetermined temperature value. The second predetermined temperature value preferably lies in the range 50° C. to 150° C.

In a variant, the second predetermined temperature value is determined from the temperature of the turbine engine at the beginning of the second ignition step. For example, the second predetermined temperature value may correspond to the temperature being about 25° C. higher than the temperature of the turbine engine at the beginning of the second ignition step.

Advantageously, the second starting step is performed concomitant with the second ignition step.

After the second starting step, the speed of the shaft increases once more and, in the invention, the above-mentioned re-try step is repeated if combustion has still not been correctly established in the combustion chamber when the shaft once more reaches the first predetermined speed value.

Advantageously, the starter and the ignitor device are stopped after the shaft has reached a third predetermined speed value.

The third predetermined speed value, higher than the second predetermined speed value, is selected in such a manner that when the speed of the shaft has reached this value, it is certain that the turbine engine is operating autonomously.

At this moment, fuel is atomized only by the main injectors.

Preferably, the third predetermined rotation value lies in the range 30% to 65% of the maximum engine speed.

In this variant, the re-try step may be repeated several times over in the event of successive failures. Nevertheless, it may be advantageous to limit the number of attempts that should preferably be carried out automatically by appropriate control means. By way of non-limiting example, with a helicopter engine, it is preferable to make only two attempts at starting (a first starting step and a re-try step).

In a preferred embodiment, the chamber also includes a starting injector, which injector is preferably distinct from the main injector(s). During the first ignition step, the starting injector injects fuel into the combustion chamber.

It can thus be understood that in this embodiment, such a turbine engine, which, by way of example but not necessarily, may be a helicopter turboshaft engine, is started by making use of one or more dedicated injectors that are referred to as starting injectors. In order to start the turbine engine, the flame from these injectors is subsequently transmitted to the main injection system which is constituted by the main injector(s).

In this embodiment, the starting injector is preferably, but not exclusively, also stopped during the stop step and the re-try step.

Furthermore, still in this embodiment, the starting injector injects fuel into the combustion chamber during the second ignition step.

The present invention also relates to a computer program including instructions for executing steps of the starting method of the invention when the computer program is executed on a computer. The invention also relates to a computer-readable storage medium having the above-mentioned computer program stored thereon.

Finally, the invention provides a turbine engine computer including the storage medium of the invention.

BRIEF DESCRIPTION OF THE SEVERAL VIEWS OF THE DRAWINGS

The invention can be better understood and its advantages appear better on reading the following description of an embodiment given by way of non-limiting example. The description refers to the accompanying drawings, in which.

DETAILED DESCRIPTION OF THE INVENTION

Figure 3:
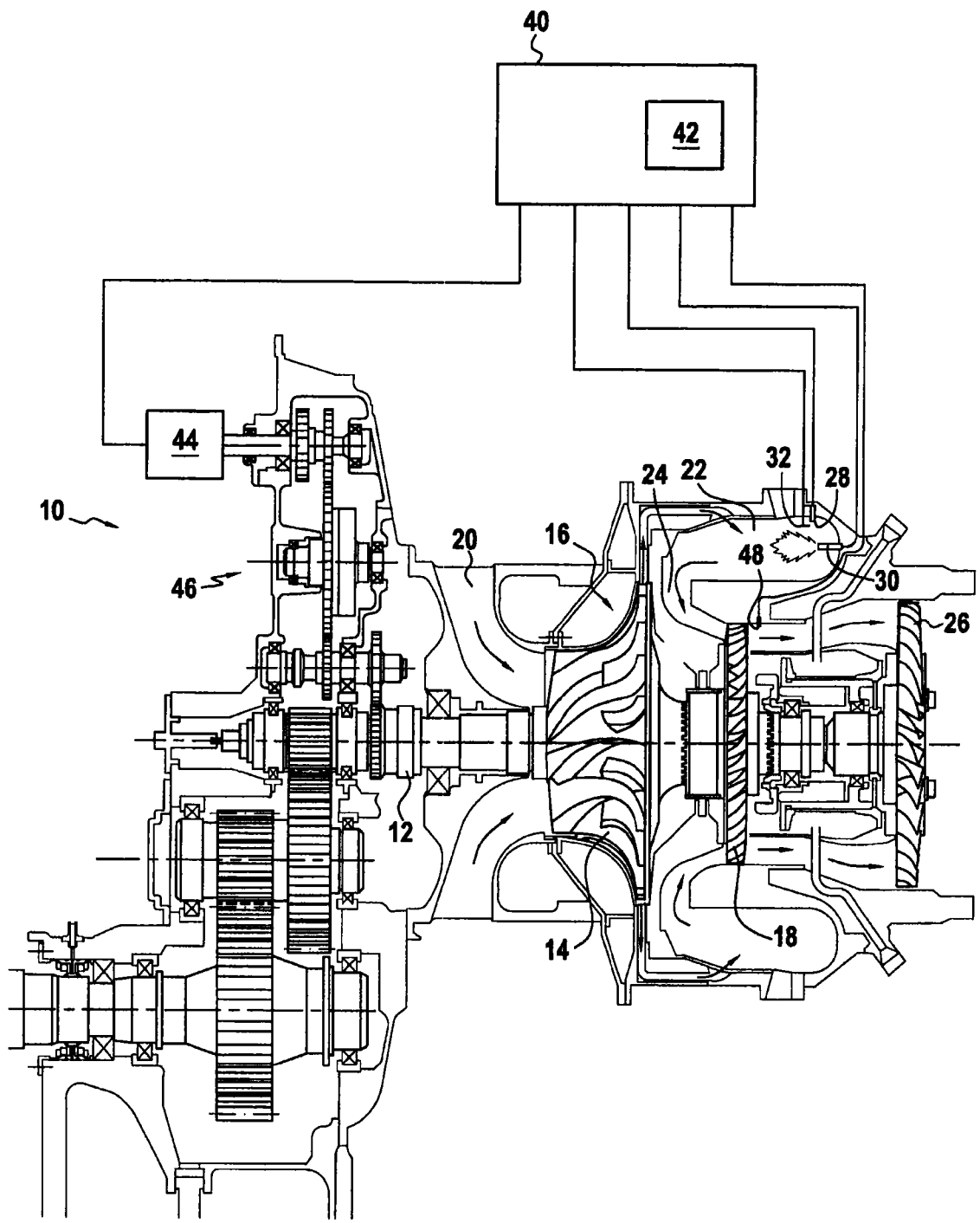
FIG. 3 shows a helicopter turboshaft engine including a computer for implementing the starting method of the invention.

An example of a helicopter turboshaft engine 10 is shown in FIG. 3. Conventionally, the turboshaft engine 10 has a shaft 12 having mounted thereon in succession a compressor wheel 14 of a compression stage 16, and a high pressure turbine wheel 18. The turboshaft engine 10 also has a fresh air inlet 20 leading to the compression stage. The air compressed by the compression stage 16 is taken to a combustion chamber 22 where it is mixed with fuel. The mixture as obtained in this way is burnt and the combustion gas is discharged from the combustion chamber 22 via its outlet 24. As can be seen in FIG. 3, the stream of burnt gas drives the high pressure turbine wheel 18 in rotation and also drives rotation of a free turbine 26 arranged downstream from the high pressure turbine wheel 18.

Thus, and in known manner, in normal operation, the shaft is driven in rotation by the stream of burnt gas generated by the combustion chamber.

Attention is paid herein more particularly to the combustion chamber 22.

As can be seen in FIG. 3, the combustion chamber has one or more starting injectors 28 (only one is shown) and several main injectors 30 (only one is shown).

Naturally, the starting method of the invention may be used in a turbine engine having a combustion chamber without any starting injectors or in which the main injector also acts as a starting injector. The embodiment described below is thus not limiting.

The function of the main injectors is to atomize the fuel in the combustion chamber 22 in order to mix it with the compressed air.

Furthermore, an ignitor device 32 associated with the starting injectors 28 enables them to be ignited. The ignitor device 32 serves to ignite the fuel atomized by the starting injectors 28. By way of example, the ignitor device may be a spark plug for producing a spark. Proper ignition of the starting injectors 28 then gives rise to a flame that propagates in the chamber and ignites the fuel atomized by the main injectors 30.

In accordance with the invention, the turboshaft engine 10 includes a computer 40 having a storage medium 42 of the random access memory (RAM), read only memory (ROM), or hard disk type, or of any other type of memory, which medium stores a computer program comprising instructions for executing steps of the starting method that is described below. The computer also has a microprocessor for performing the calculation. The computer program is thus executed by the computer 40.

As can be seen with reference to FIG. 3, the starting injectors 28, the main injectors 30, and the ignitor device 32 are controlled by the computer 40.

The shaft 12 is also connected to a starter 44 by means of a transmission 46 of known kind. The starter 44 serves conventionally to drive the shaft in rotation while starting the turboshaft engine.

The starter 44 is also controlled by the computer 40.

Finally, a temperature probe 48 that is connected to the computer 40 is arranged downstream from the combustion chamber 22 in such a manner as to measure the temperature T of the burnt gas leaving the combustion chamber 22, and is preferably located between the high pressure turbine 18 and the free turbine 26.

Figure 1:
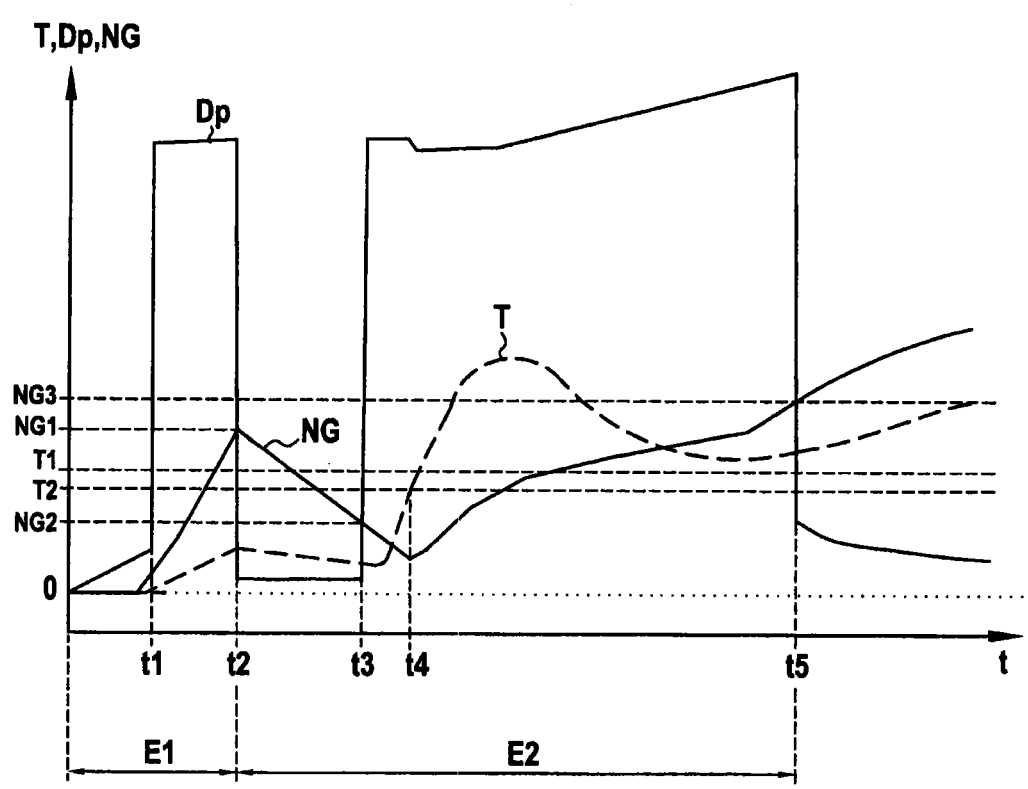
FIG. 1 is a graph showing the variation as a function of time while implementing the starting method of the invention, in the temperature at the outlet from the combustion chamber, in the speed of rotation of the shaft, and in the fuel injection pressure.
Figure 2:
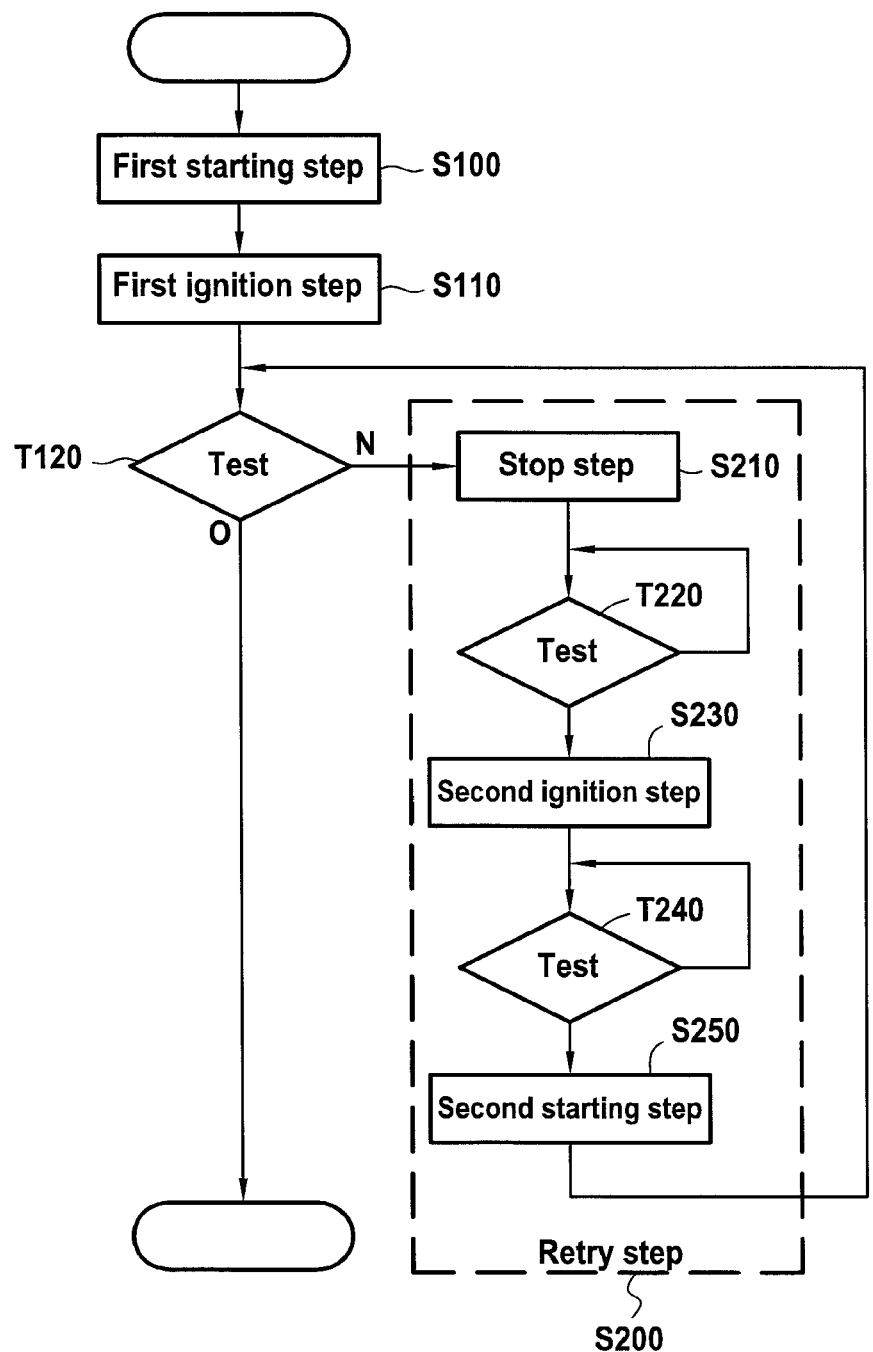
FIG. 2 is a flow chart showing the starting method of the invention.

With reference to FIGS. 1 and 2, there follows a description of an embodiment of the starting method of the invention for a helicopter turboshaft engine 10. Naturally, this starting method is entirely suitable for use with other types of turbine engine.

The graph shown in FIG. 1 is a superposition of a plurality of curves, namely the curve plotting the temperature T of the burnt gas downstream from the combustion chamber, the curve plotting the speed of rotation NG of the shaft 12, and the curve plotting the fuel pressure Dp as atomized by the starting injectors 28.

Time t is plotted along the abscissa axis.

More precisely, FIG. 1 shows the starting method of the invention that advantageously includes a re-try step E2 that is performed after a first attempt at starting E1 has failed.

During the first attempt at starting, a first starting step S100 is performed during which the starter 44 is actuated in order to drive the shaft 12 in rotation. This step is triggered shortly before instant t1.

At instant t1, a first ignitor step S110 is performed during which the starting injector(s) inject(s) fuel into the combustion chamber 22, the ignitor device itself being actuated in order to ignite the fuel atomized by the starting injector. In other words, as from instant t1, it is desired to ignite the starting injector and then the main injectors.

Between instants t1 and t2, the speed of the shaft 12 as driven by the starter 44 increases while the starting injector is atomizing fuel, while nevertheless not being able to produce a flame that is sufficiently stable to ignite the combustion chamber. As a result the temperature T increases very little.

According to the invention, the temperature T is measured at instant t2 which corresponds to the instant at which the speed of rotation of the shaft 12 exceeds a first predetermined speed value NG1, specifically 20% of the maximum engine speed NGmax, which speed is of the order of several thousands of revolutions per minute (rpm).

At this stage, a test T120 is performed: if the measured temperature is higher than or equal to a first predetermined temperature value T1, specifically 250° C., then the test is positive, which means that combustion has been correctly initiated and that the turbine engine is starting correctly.

Otherwise, if the measured temperature T is less than T1, as in the example shown, then the test is negative, which means that the main injectors 30 have not been ignited, in other words that combustion is not correctly established and that therefore the turbine engine has not started.

Under such circumstances, and in accordance with the invention, a re-try step S200 is performed seeking to attempt once more to start the turboshaft engine 10.

This re-try step S200 comprises the following steps in succession.

Firstly, during a stop step S210, the starter 44 is stopped, as is the starting injector 28, and also the ignitor device 32. After that, the speed NG of the shaft 12 decreases insofar as it is no longer being driven by the starter.

Thereafter, during a test T220, it is determined whether the speed NG of the shaft 12 has reached a second predetermined speed value NG2, specifically 10% of the above-mentioned maximum engine speed. If the test T220 is negative, then the test is repeated. Conversely, if the test T220 is positive, that means that the speed of the shaft 12 has returned to the ignition range. Then, in the invention, a second ignition step S230 is performed in order to ignite the starting injectors, during which step the starting injector 28 injects fuel into the combustion chamber 22, with the ignitor device 32 then being actuated. In the graph of FIG. 1, the second ignition step S230 starts at instant t3.

Thereafter, a second starting step S250 is performed during which the starter is once more actuated in order to drive the shaft 12 in rotation. This second starting step is performed if it is detected during a test T240 that the temperature T as measured at the outlet from the combustion chamber has reached a second predetermined temperature value T2, specifically 50° C. In the example shown, the second starting step S250 is performed at the instant t4. As from this instant, the speed of rotation NG of the shaft 12 increases once again.

Thereafter, once more, the test T120 is performed, i.e. the temperature is measured at the outlet from the combustion chamber 22 at the instant when the shaft 12 reaches the value NG1 once more. In the graph, it can be seen that at this instant, the temperature T is higher than the first predetermined temperature value T1, indicating that the main injectors 30 have ignited and thus that the turboshaft engine 10 has very probably started correctly.

At instant t5, when the shaft has reached a third predetermined speed value NG3, specifically 50% of the maximum entity, the starter is stopped, as are the starting injector and the ignitor device, since the turboshaft engine is now operating in autonomous manner.

The invention claimed is:

1. A method of starting a turbine engine, the turbine engine including: a combustion chamber including an ignitor device and at least one main injector, the combustion chamber including an outlet, a shaft connected to a compressor wheel arranged upstream from the combustion chamber to feed the combustion chamber with compressed air, and a starter connected to the shaft, the method comprising:
a first starting during which the starter is actuated to drive the shaft in rotation;
a first igniting during which fuel is injected into the combustion chamber, the ignitor device being actuated;
performing a re-try when the at least one main injector has not ignited when the shaft has reached a first predetermined speed value, performing the re-try comprising:
a stopping during which the starter and the ignitor device are stopped;
a second igniting during which fuel is injected into the combustion chamber, the ignitor device being actuated, the second igniting being performed when a speed of rotation of the shaft reaches a second predetermined speed value; and
a second starting during which the starter is actuated once more to drive the shaft in rotation.

2. A starting method according to claim 1, wherein the stopping is performed when a temperature at an outlet from the combustion chamber, as measured when the shaft has reached the first predetermined speed value, is lower than a first predetermined temperature value.

3. A starting method according to claim 2, wherein the second starting is performed when a temperature downstream from the combustion chamber has reached a second predetermined temperature value.

4. A starting method according to claim 1, wherein the second starting is performed after a certain lapse of time since the second igniting.

5. A starting method according to claim 1, wherein the second starting is performed concomitant with the second igniting.

6. A starting method according to claim 1, wherein the starter and the ignitor device are stopped after the shaft has reached a third predetermined speed value.

7. A starting method according to claim 1, wherein the combustion chamber further includes a starting injector, wherein the starting injector injects fuel into the combustion chamber during the first igniting, wherein the starting injector is stopped during the stopping, and wherein the starting injector injects fuel into the combustion chamber during the second igniting.

8. A method according to claim 7, wherein the starting injector is stopped after the shaft has reached a third predetermined speed value.

9. A non-transitory computer readable medium including computer executable instructions to be executed on a computer for executing a starting method according to claim 1.

10. A turbine engine computer comprising a non-transitory computer readable storage medium according to claim 9.

* * * * *